(12) United States Patent
Yamamoto et al.

(10) Patent No.: US 9,304,600 B2
(45) Date of Patent: Apr. 5, 2016

(54) GESTURE RECOGNITION DEVICE, ELECTRONIC APPARATUS, GESTURE RECOGNITION DEVICE CONTROL METHOD, CONTROL PROGRAM, AND RECORDING MEDIUM

(75) Inventors: Motoo Yamamoto, Kyoto (JP); Yuichi Abe, Kyoto (JP); Yuki Hanzawa, Nara (JP); Takahiro Takayama, Shiga (JP)

(73) Assignee: OMRON Corporation, Kyoto (JP)

( * ) Notice: Subject to any disclaimer, the term of this patent is extended or adjusted under 35 U.S.C. 154(b) by 23 days.

(21) Appl. No.: 14/235,424

(22) PCT Filed: Mar. 14, 2012

(86) PCT No.: PCT/JP2012/056517
§ 371 (c)(1),
(2), (4) Date: Apr. 4, 2014

(87) PCT Pub. No.: WO2013/038733
PCT Pub. Date: Mar. 21, 2013

(65) Prior Publication Data
US 2014/0225825 A1 Aug. 14, 2014

(30) Foreign Application Priority Data
Sep. 15, 2011 (JP) ................................ 2011-202433

(51) Int. Cl.
*G06F 3/01* (2006.01)
*H04N 21/4223* (2011.01)
*G06K 9/00* (2006.01)
*H04N 21/442* (2011.01)

(52) U.S. Cl.
CPC ............ *G06F 3/017* (2013.01); *G06K 9/00362* (2013.01); *H04N 21/4223* (2013.01); *H04N 21/44218* (2013.01)

(58) Field of Classification Search
None
See application file for complete search history.

(56) References Cited

U.S. PATENT DOCUMENTS

| 7,961,174 | B1 | 6/2011 | Markovic et al. |
| 2010/0040292 | A1* | 2/2010 | Clarkson ............ G06K 9/00355 382/201 |

(Continued)

FOREIGN PATENT DOCUMENTS

| JP | 2002-149302 A | 5/2002 |
| JP | 2004-303207 A | 10/2004 |

(Continued)

OTHER PUBLICATIONS

Extended European Search Report issued in corresponding European Application No. 12832280.7, mailed on Apr. 13, 2015 (8 pages).

(Continued)

*Primary Examiner* — Joseph Haley
*Assistant Examiner* — Emily Frank
(74) *Attorney, Agent, or Firm* — Osha Liang LLP

(57) ABSTRACT

A gesture recognition device that recognizes a gesture of a person from an image captured by a camera, and outputs information to an electronic apparatus in order to control the electronic apparatus based on the recognized gesture, has a person determination section that determines whether the person is included in the image, and an output section that outputs person out-of-view angle notification instruction information issuing an instruction to make a notification that the image of the person is not captured, when the person determination section determines that the person is not included in the image.

19 Claims, 8 Drawing Sheets

(56) References Cited

U.S. PATENT DOCUMENTS

| | | | |
|---|---|---|---|
| 2010/0066689 A1* | 3/2010 | Jung | H04N 21/42203 345/173 |
| 2010/0205667 A1* | 8/2010 | Anderson et al. | 726/19 |
| 2011/0080254 A1* | 4/2011 | Tran et al. | 340/5.1 |
| 2011/0175810 A1* | 7/2011 | Markovic et al. | 345/158 |
| 2012/0042288 A1* | 2/2012 | Liao et al. | 715/863 |

FOREIGN PATENT DOCUMENTS

| | | |
|---|---|---|
| JP | 2005-115932 A | 4/2005 |
| JP | 2007-166187 A | 6/2007 |
| JP | 2008-015641 A | 1/2008 |
| JP | 2008-158790 A | 7/2008 |
| JP | 2008-244804 A | 10/2008 |
| JP | 2009-301301 A | 12/2009 |
| JP | 2010-541398 A | 12/2010 |

OTHER PUBLICATIONS

International Search Report issued in PCT/JP2012/056517 mailed on Jun. 19, 2012 (2 pages).

\* cited by examiner

Fig. 3

Television-set processing history information

| Processing date and time | Processing content |
|---|---|
| 2011/9/1 7:00 | Power-on |
| 2011/9/1 7:01 | Channel change |
| 2011/9/1 7:08 | Volume change |
| ⋮ | ⋮ |

Fig. 4

Person identification information

| User | Feature quantity | Sex | Body height | Age | Race | Accessory |
|---|---|---|---|---|---|---|
| Father | F1234 | Male | 180cm | 35 year olds | Yellow race | Watch |
| Mother | M1234 | Female | 160cm | 30 year olds | Yellow race | Ring |
| Child | S1234 | Male | 120cm | 7 year olds | Yellow race | Non-existence |

Fig. 5

User information

| Operation target person | Father |
|---|---|
| Operation prohibited person | Child |

Fig. 6

Operation timing information 43

| | |
|---|---|
| Condition considered to be operation timing | Within 5 minutes since operation with gesture |
| | For 5 minutes after 20 minutes have elapsed since operation with gesture |
| | For 5 minutes after operation to power on television set |
| | For 1 minute after operation to change volume |
| | For 5 minutes after 1 hour has elapsed since operation to change channel |
| | During commercial display |
| | ... |

Fig. 7

Gesture information

| Operation signal | Gesture | |
|---|---|---|
| S01 | State in which only index finger of right hand is raised |  |
| S02 | Motion to vertically swing left hand | 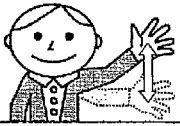 |
| S03 | Motion to horizontally wave right hand | 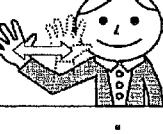 |
| ... | ... | ... |

Fig. 8

Gesture recognition device processing history information

| Processing date and time | Operation signal | Operation target person |
|---|---|---|
| 2011/9/1 7:00 | S01 | Father |
| 2011/9/1 7:01 | S02 | Father |
| 2011/9/1 7:08 | S03 | Father |
| ⋮ | ⋮ | ⋮ |

GESTURE RECOGNITION DEVICE, ELECTRONIC APPARATUS, GESTURE RECOGNITION DEVICE CONTROL METHOD, CONTROL PROGRAM, AND RECORDING MEDIUM

BACKGROUND

1. Technical Field

The present invention relates to a gesture recognition device that captures an image of a user's motion with a camera and recognizes a gesture of the user from the captured image, an electronic apparatus, a gesture recognition device control method, a control program, and a recording medium.

2. Related Art

Recently, there have been developed various information input devices that recognize a gesture of a user to generate a control signal controlling an apparatus. For example, Patent Documents 1 and 2 disclose the information input device. Specifically, in some information input devices, the user operates an input device such as a pointing device, a pen-type device, and a touch pad, and the input device detects a user's motion to recognize a gesture of the user.

On the other hand, in some information input devices, a camera captures an image of the user's motion with no use of the input device, and the gesture of the user is recognized from the captured image. Hereinafter, the information input device that recognizes the gesture of the user from the image is referred to as a gesture recognition device. In the gesture recognition device, it is not necessary for the user to operate the input device, but the user can intuitively input an operation instruction to the device. Therefore, the gesture recognition device is expected to serve as a next-generation interface.

Patent Document 1: Japanese Unexamined Patent Publication No. 2004-303207 (published in Oct. 28, 2004)
Patent Document 2: Japanese Unexamined Patent Publication No. 2009-301301 (published in Dec. 24, 2009)
Patent Document 3: Japanese Unexamined Patent Publication No. 2007-166187 (published in Jun. 28, 2007)
Patent Document 4: Japanese Unexamined Patent Publication No. 2008-244804 (published in Oct. 9, 2008)

SUMMARY

However, in the conventional gesture recognition device, the user does not know whether the gesture recognition device is in a state of recognizing the gesture of the user. In other words, the user cannot correctly judge whether the gesture of the user falls within a view angle of the camera. Therefore, sometimes the user makes an identical motion many times or uselessly devises the motion in hope that the gesture is recognized, even when the gesture recognition device is not in a state of recognizing the gesture of the user.

At this point, there is a technology of determining whether a whole body or a face of a human falls within the view angle during photographing with the camera and issuing a warning when the whole body or the face does not fall within the view angle (see Patent Documents 3 and 4). However, the technology described in Patent Documents 3 and 4 is not the technology related to the gesture recognition device, but the technology related to the general camera. Conventionally, notification whether the gesture falls within the view angle is not made in the gesture recognition device.

A gesture recognition device according to one or more embodiments of the present invention makes notification when the gesture of the user does not fall within the view angle. Additionally, one or more embodiments of the present invention may be any of an electronic apparatus, a gesture recognition device control method, a control program, and a recording medium.

According to one or more embodiments of the present invention, a gesture recognition device that recognizes a gesture of a person from an image captured by a camera, and outputs information to an electronic apparatus in order to control the electronic apparatus based on the recognized gesture, the gesture recognition device includes: a person determination section configured to determine whether the person is included in the image; and an output section configured to output person out-of-view angle notification instruction information issuing an instruction to make a notification that the image of the person is not captured, when the person determination section determines that the person is not included in the image.

According to one or more embodiments of the present invention, a method for controlling a gesture recognition device that recognizes a gesture of a person from an image captured by a camera, and outputs information to an electronic apparatus in order to control the electronic apparatus based on the recognized gesture, the gesture recognition device control method includes: a person determination step of determining whether the person is included in the image; and an output step of outputting person out-of-view angle notification instruction information issuing an instruction to make a notification that the image of the person is not captured, when the person is determined to be not included in the image in the person determination step.

According to the configuration, the output section outputs the person out-of-view angle notification instruction information issuing the instruction to make the notification that the image of the person is not captured to the electronic apparatus when the person is not included in the image captured by the camera. Based on the person out-of-view angle notification instruction information, the electronic apparatus notifies the person who operates the electronic apparatus that the image of the person is not captured.

Based on the notification from the electronic apparatus, the person who operates the electronic apparatus can understand whether the person is included in the image captured by the camera, namely, whether the person is outside of the view angle of the camera. Therefore, such a useless motion that the person who operates the electronic apparatus makes the identical motion many times in order to cause the electronic apparatus to recognize the gesture although the camera does not capture the image of the person can advantageously be prevented.

As described above, a gesture recognition device according to one or more embodiments of the present invention includes the person determination section for determining whether the person is included in the image and the output section for outputting the person out-of-view angle notification instruction information issuing the instruction to make a notification that the image of the person is not captured when the person determination section determines that the person is not included in the image.

A gesture recognition device control method according to one or more embodiments of the present invention includes the person determination step of determining whether the person is included in the image and the output step of outputting the person out-of-view angle notification instruction information issuing the instruction to make a notification that the image of the person is not captured when the person is determined to be not included in the image in the person determination step.

Accordingly, such a useless motion that the person makes the identical motion many times in order to cause the electronic apparatus to recognize the gesture although the camera does not capture the image of the person can advantageously be prevented.

BRIEF DESCRIPTION OF THE DRAWINGS

FIG. 3 is a chart illustrating an example of television-set processing history information stored in a television-set storage unit of the television set.

FIG. 4 is a chart illustrating an example of person identification information stored in a gesture-recognition-device storage unit of the gesture recognition device.

FIG. 5 is a chart illustrating an example of user information stored in the gesture-recognition-device storage unit of the gesture recognition device.

FIG. 6 is a chart illustrating an example of operation timing information stored in the gesture-recognition-device storage unit of the gesture recognition device.

FIG. 7 is a chart illustrating an example of gesture information stored in the gesture-recognition-device storage unit of the gesture recognition device.

FIG. 8 is a chart illustrating an example of gesture recognition device processing history information stored in the gesture-recognition-device storage unit of the gesture recognition device.

DETAILED DESCRIPTION

Figure 1:
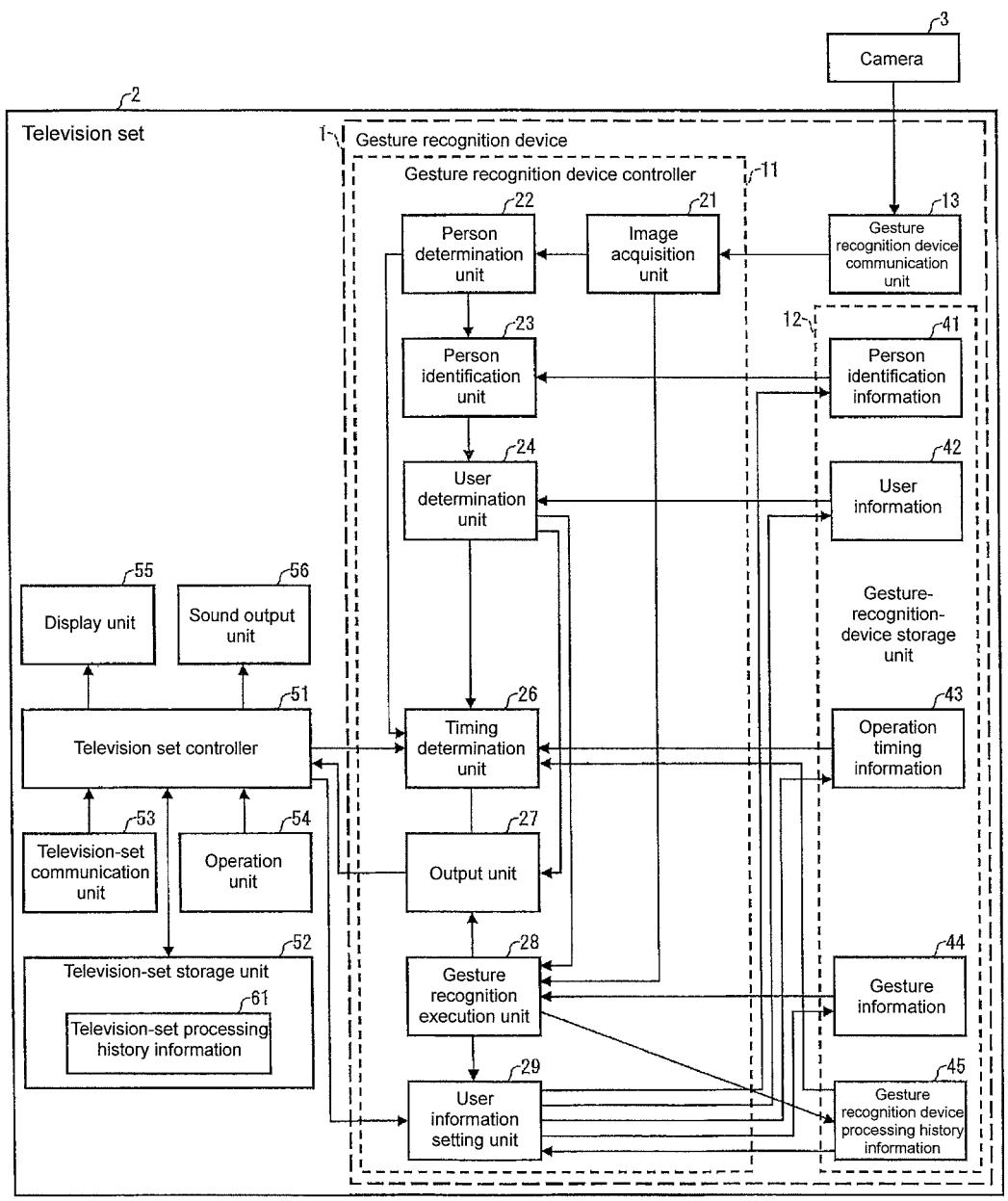
FIG. 1 is a block diagram illustrating one or more embodiments of the present invention, which shows main-part configurations of a gesture recognition device and a television set provided with the gesture recognition device.
Figure 2:
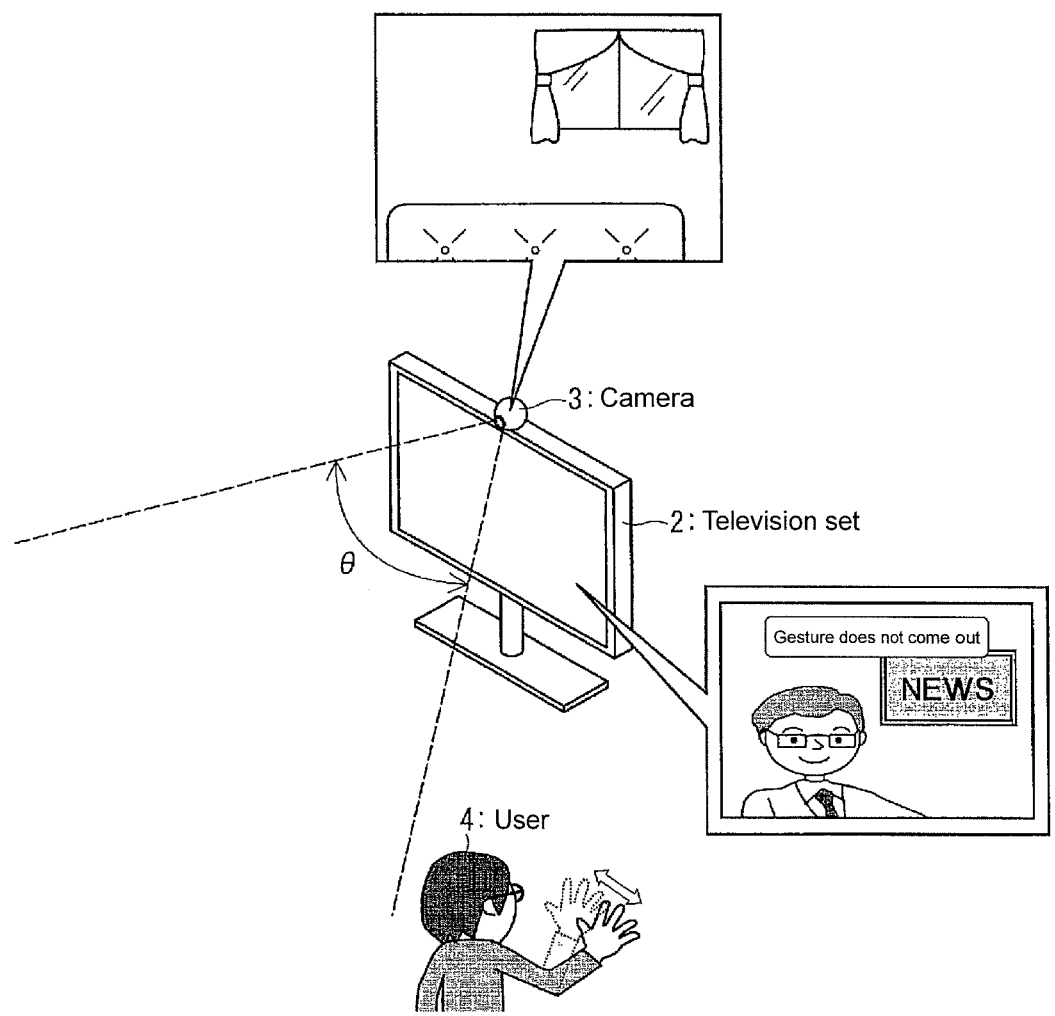
FIG. 2 is a view illustrating an example of a usage mode of the television set provided with the gesture recognition device.

Hereinafter, embodiments of the present invention will be described in detail with reference to FIGS. 1 to 13. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. In one or more embodiments of the present invention, in the case that a user (operator) is outside of a view angle of a camera while operating an electronic apparatus with a gesture, the user is notified of that effect. FIG. 2 illustrates an example of a usage mode of the electronic apparatus provided with a gesture recognition device according to according to one or more embodiments the present invention. FIG. 2 is a view illustrating an example of the usage mode of the electronic apparatus provided with the gesture recognition device according to one or more embodiments of the present invention.

FIG. 2 illustrates the case that the electronic apparatus is a television set 2 while the gesture recognition device is incorporated in the television set 2. As illustrated in FIG. 2, in the case that a user 4 is outside of a view angle θ of a camera 3, a message "person does not come out" is displayed on the television set 2 in order to notify the user 4 that an image of the user or gesture is not captured.

The notification enables the user to know whether the image of the gesture of the user is captured. Therefore, such a useless motion that the user tries the same gesture many times in order to cause the camera to recognize the gesture although the image of the gesture is not captured can be prevented.

In one or more of the below embodiments, the electronic apparatus is the television set by way of example. However, the electronic apparatus is not limited to the television set. For example, the electronic apparatus may be a mobile phone, a game machine, a digital camera, or a security gate (door).

In one or more of the below embodiments, it is assumed that the television set 2 provided with the gesture recognition device is installed in home, and that a "father", a "mother", and a "child" exist as the user. In one or more of the below embodiments, the specific user uses the electronic apparatus. However, there is no particular limitation to the user. General public may use the electronic apparatus according to one or more embodiments of the present invention. For example, a large indefinite number of users exist in a hospital, and sometimes it is undesirable that the users directly operate the electronic apparatus. Therefore, in the hospital, the gesture recognition device can suitably be used as a device for operating the electronic apparatus.

As used herein, the user means a person who operates the electronic apparatus (a person who tries to operate the electronic apparatus).

<Configurations of Television Set and Gesture Recognition Device>

Specific configurations and functions of the television set 2 and a gesture recognition device incorporated in the television set 2 will be described below. FIG. 1 is a block diagram illustrating an example of main-part configurations of the television set 2 and a gesture recognition device 1 incorporated in the television set 2. The configuration of the television set 2 will be described.

[Configuration of Television Set]

As illustrated in FIG. 1, the television set 2 includes a television set controller 51, a television-set storage unit 52, a television-set communication unit 53, an operation unit 54, a display unit (notification section) 55, a sound output unit (notification section) 56, and the gesture recognition device 1. The television set 2 may include a member such as a sound input unit. However, the sound input unit is not illustrated in the television set 2 in FIG. 1.

The television-set communication unit 53 conducts communication with another device by way of wireless communication or wired communication, and exchanges data with another device in response to an instruction from the television set controller 51. Specifically, the television-set communication unit 53 is an antenna that receives a broadcast wave to receive video image data, sound data, TV program data, and the like.

The operation unit 54 is used by the user who inputs an operation signal to the television set 2 to operate the television set 2. The operation unit 54 may be constructed by an input device such as an operation button. The operation unit 54 and the display unit 55 may be integrated with each other to construct a touch panel. The operation unit 54 may be a remote control device such as a remote controller, which is provided independently of the television set 2. Because the television set 2 includes the gesture recognition device 1, the television set 2 is not required to include the operation unit 54.

The display unit 55 displays the image in response to the instruction from the television set controller 51. Displays such as an LCD (Liquid Crystal Display), an organic EL display, and a plasma display can be applied to the display unit 55 as long as the displays display the image in response to the instruction from the television set controller 51.

The sound output unit 56 outputs sound in response to the instruction from the television set controller 51. For example, the sound output unit 56 is a loudspeaker.

By executing a program read to a temporary storage unit (not illustrated) from the television-set storage unit 52, the television set controller 51 wholly controls each unit included in the television set 2 while performing various calculations.

Specifically, based on the video image data, the sound data, and the TV program data, which are acquired through the television-set communication unit 53, the television set controller 51 causes the display unit 55 to display a video image or TV program information or to output the sound from the sound output unit 56. Based on the operation signal from the operation unit 54 or the gesture recognition device 1, the television set controller 51 performs predetermined processing such as power-on and -off, channel switching, a volume change, and the display of a TV program table. When performing the predetermined processing, the television set controller 51 stores the predetermined processing as television-set processing history information 61 in the television-set storage unit 52 while correlating a processing content of the performed processing with processing date and time.

Based on an instruction signal from the gesture recognition device 1, the television set controller 51 notifies the user of the information indicated by the instruction signal by displaying the information on the display unit 55 and/or outputting the sound from the sound output unit 56. The television set controller 51 may notify the user of the information indicated by the instruction signal by causing a notification lamp (not illustrated) such as an LED to emit light.

Although described in detail later, the television set controller 51 receives the instruction of the notification that the image of the gesture or operation target person is not captured or the instruction of the notification that the person is not an operation target person from the gesture recognition device 1. Based on the instruction, the television set controller 51 may display the content on the display unit 55 in a form of a text or output the content from the sound output unit 56 in the form of the sound. The television set controller 51 may display the image captured by the camera 3 on the whole or part of a screen of the display unit 55 in order to make the notification that the image of the gesture or operation target person is not captured.

The television-set storage unit 52 is used to store the program, data and the like to be referred to by the television set controller 51. For example, the television-set processing history information 61 is stored in the television-set storage unit 52.

The television-set processing history information 61 stored in the television-set storage unit 52 will be described with reference to FIG. 3. FIG. 3 is a chart illustrating an example of the television-set processing history information 61 stored in a television-set storage unit 52. As illustrated in FIG. 3, the television-set processing history information 61 is one in which the processing content of the processing performed by the television set controller 51 is correlated with the processing date and time when the processing is performed by the television set controller 51.

The gesture recognition device 1 recognizes the user's gesture from the image captured by the camera 3, and outputs a signal (information) to the electronic apparatus in order to control the electronic apparatus based on the recognized gesture. In the example of FIG. 1, the gesture recognition device 1 is incorporated in the television set 2. Alternatively, the television set 2 and the gesture recognition device 1 may be provided independently of each other. The specific configuration and function of the gesture recognition device 1 will be described below.

[Configuration of Gesture Recognition Device]

As illustrated in FIG. 1, the gesture recognition device 1 includes a gesture recognition device controller 11, a gesture-recognition-device storage unit 12, and a gesture recognition device communication unit 13.

The gesture recognition device communication unit 13 conducts communication with other devices such as the camera 3 by way of wireless communication or wired communication, and exchanges the data with other devices in response to the instruction from the gesture recognition device controller 11. Specifically, the gesture recognition device communication unit 13 acquires the image captured by the camera 3 from the camera 3 in response to the instruction from the gesture recognition device controller 11.

By executing the program read to the temporary storage unit (not illustrated) from the gesture-recognition-device storage unit 12, the gesture recognition device controller 11 wholly controls each unit included in the gesture recognition device 1 while performing various calculations.

In one or more embodiments of the present invention, a gesture recognition device controller 11 includes an image acquisition unit 21, a person determination unit (person determination section) 22, a person identification unit 23, a user determination unit (operation target person determination section and operation prohibited person determination section) 24, a timing determination unit (timing determination section) 26, an output unit (output section) 27, a gesture recognition execution unit 28, and an information setting unit 29 as a functional block. The functional blocks (21 to 24, and 26 to 29) of the gesture recognition device controller 11 can be implemented in a manner that a CPU (Central Processing Unit) reads the program stored in a storage device constructed by a ROM (Read Only Memory) to the temporary storage unit constructed by a RAM (Random Access Memory) and executes the program.

The image acquisition unit 21 acquires the image captured by the camera 3 from the camera 3 through the gesture recognition device communication unit 13.

The person determination unit 22 determines whether the person comes out in the image acquired by the image acquisition unit 21. For example, the person determination unit 22 performs human body detection or face detection to the image, and determines that the image of the person is captured in the case that a whole body or the region, such as the face (head), the hand, and the leg, which is the part of the human body is detected as a result. The person determination unit 22 performs the human body detection or the face detection to the image, identifies a degree of detection reliability of the whole body or the region as the detection result, and determines that the image of the person is captured in the case that the degree of detection reliability is greater than or equal to a predetermined value.

In other words, the person determination unit 22 determines that the image of the person is captured in the case that the whole body or the region of the human is included in the image acquired by the image acquisition unit 21. The person determination unit 22 may detect one or a plurality of persons from one image. The person determination unit 22 is required only to determine whether the person comes out in the acquired image, but there is no limitation to a technique of determining whether the person comes out in the acquired image.

For example, in the person determination unit 22, technologies described in Japanese Unexamined Patent Publication Nos. 2005-115932, 2008-158790, and 2008-15641 or a learning type human body detection technology may be used in order to detect the whole body or the region, such as the face (head), the hand, and the leg, which is the part of the human body.

The person identification unit 23 reads person identification information 41 from the gesture-recognition-device storage unit 12, and identifies the person detected by the person determination unit 22 based on the person identification information 41.

Specifically, in the case that the information individually identifying the "father", the "mother", and the "child" is included as the person identification information 41, the person identification unit 23 may authenticate the whole body image, the face image, and the like, which are detected by the person determination unit 22, and identify which one of the "father", the "mother", or the "child" the detected person corresponds to. For example, the person identification unit 23 may calculate a feature quantity of the face image detected by the person determination unit 22, compare the calculated feature quantity to the feature quantities of the face images of the "father", the "mother", and the "child", and identify the most approximate person as the person of the face image detected by the person determination unit 22.

The person identification unit 23 may identify sex, age, race, and the like from the whole body image, the face image, the hand image, and the like, which are detected by the person determination unit 22, and identify the person detected by the person determination unit 22 based on the identified result. An accessory may be detected from the whole body image, the face image, the hand image, and the like, which are detected by the person determination unit 22, and identify the person detected by the person determination unit 22 based on the accessory worn by the person.

In the case that the person determination unit 22 detects the whole body image or the image (for example, a half body image or the image in which only a part of the face, the hand, or the leg comes out) in which the part of the face or the like comes out, the person identification unit 23 may perform the processing of identifying the person after the remaining image in which a part does not come out is complemented. For example, in the case of the half body image or the half face image, the processing of identifying the person may be performed after mirroring.

The person identification unit 23 may identify the person detected by the person determination unit 22 not only as an individual but may also identify an attribute of the person such as the sex, the age, and the race. The person identification unit 23 has only to identify the individual or the attribute, but there is no limitation to the identification technique. The person identification unit 23 may identify the individual or the attribute by a well-known technology except the above technology.

The user determination unit 24 reads user information 42 from the gesture-recognition-device storage unit 12, and determines whether the person identified by the person identification unit 23 is an operation target person based on the user information 42. The user determination unit 24 determines whether the person identified by the person identification unit 23 is an operation prohibited person based on the user information 42.

As used herein, the operation target person means a person who can operate the television set 2 with the gesture. In other words, only the user who is set as the operation target person can operate the television set 2 with the gesture. The operation prohibited person means a person who is prohibited from operating the television set 2 with the gesture.

The timing determination unit 26 determines whether present time is operation timing on when the user wants to perform the operation with the gesture based on the present or past processing of the television set 2 or the gesture recognition device 1. Specifically, the timing determination unit 26 reads operation timing information 43 from the gesture-recognition-device storage unit 12. Then the timing determination unit 26 reads gesture recognition device processing history information 45 from the gesture-recognition-device storage unit 12, acquires information indicating a present processing content of the television set 2 from the television set controller 51 and television-set processing history information 61 indicating a past processing content, and determines whether the present time is the operation timing indicated by the operation timing information 43.

The output unit 27 outputs an instruction signal issuing an instruction to make a notification of predetermined information or an instruction signal issuing an instruction to delete the notification to the television set controller 51 based on the determination results of the person determination unit 22, user determination unit 24, and timing determination unit 26.

Specifically, in the case that the person determination unit 22 determines that the image of the person is not captured, and that the timing determination unit 26 determines that the present time is the operation timing, the output unit 27 outputs a person out-of-view angle notification instruction signal (person out-of-view angle notification instruction information) issuing an instruction to make a notification that the image of the operation target person (user) is not captured to the television set controller 51. In the case that the person determination unit 22 determines that the image of the person is not captured, and that the timing determination unit 26 determines that the present time is the operation timing, instead of the person out-of-view angle notification instruction signal, the output unit 27 may output a gesture out-of-view angle notification instruction signal issuing an instruction to make a notification that the image of the gesture is not captured to the television set controller 51. In the case that the user determination unit 24 determines that the person is neither the operation target person nor the operation prohibited person, and that the timing determination unit 26 determines that the present time is the operation timing, the output unit 27 outputs a non-operation target person notification instruction signal (non-operation target person notification instruction information) issuing an instruction to make a notification that the person is not the operation target person to the television set controller 51. In the case that the user determination unit 24 determines that the person is the operation target person, and that the television set 2 makes notification that the image of the gesture is captured or notification that the person is not the operation target person, the output unit 27 outputs a notification deletion instruction signal issuing an instruction to delete the notification to the television set controller 51.

In the case that the person determination unit 22 determines that the image of the person is not captured, the output unit 27 may output the person out-of-view angle notification instruction signal issuing the instruction to make a notification that the image of the operation target person (user) is not captured to the television set controller 51.

The output unit 27 outputs an operation signal generated by the gesture recognition execution unit 28 to the television set controller 51. The output unit 27 outputs a gesture recognition error signal generated by the gesture recognition execution unit 28 to the television set controller 51.

The gesture recognition execution unit 28 performs the gesture recognition processing in the case that the user determination unit 24 determines that the person is the operation target person. Specifically, when starting the gesture recognition processing, the gesture recognition execution unit 28 reads the gesture information 44 from the gesture-recognition-device storage unit 12 while acquiring a plurality of images arrayed in time series from the image acquisition unit 21. The gesture recognition execution unit 28 detects the gesture indicated by the gesture information 44 from the acquired plurality of images.

When detecting a predetermined gesture, the gesture recognition execution unit 28 generates the operation signal correlated with the detected gesture in the gesture information 44. On the other hand, the gesture recognition execution unit 28 may generate the gesture recognition error signal in the case that the gesture cannot be detected.

The gesture recognition execution unit 28 generates the gesture recognition device processing history information 45 while correlating the date and time when the gesture recognition processing is performed, the generated operation signal or gesture recognition error signal, and the operation target person with one another, and stores the gesture recognition device processing history information 45 in the gesture-recognition-device storage unit 12.

The information setting unit 29 sets the person identification information 41, the user information 42, the operation timing information 43, and the gesture information 44. Specifically, the information setting unit 29 acquires the operation signal input to the operation unit 54 from the television set controller 51 or acquires the operation signal from the gesture recognition execution unit 28 in response to the instruction from the user, and the information setting unit 29 generates or updates each piece of information based on the acquired operation signal.

When a predetermined number of processing histories are stored as the gesture recognition device processing history information 45 in the gesture-recognition-device storage unit 12, the information setting unit 29 may refer to the gesture recognition device processing history information 45, set the person who performs the operation with the gesture predetermined times to the operation target person, and update the user information 42.

When the new processing history is stored as the gesture recognition device processing history information 45 in the gesture-recognition-device storage unit 12, the information setting unit 29 may refer to the latest gesture recognition device processing history information 45, set only the person who performs the operation with the gesture at the last minute to the operation target person, and update the user information 42.

The information setting unit 29 may refer to the gesture recognition device processing history information 45, set one or a plurality of persons who perform the operation with the gesture within a predetermined period to the operation target person for the limited predetermined period, and update the user information 42. For example, when a user X performs the operation with the gesture, it is assumed that the next 5 minutes are set to operation waiting time. It is assumed that a user Y performs the operation with the gesture within the operation waiting time. In this case, the information setting unit 29 sets the user X and the user Y to the operation target person for a predetermined operation target person valid period (for example, for 15 minutes) after the operation waiting time is ended.

The information setting unit 29 may cancel the setting of the operation target person or operation prohibited person after the predetermined period has elapsed since the operation target person or the operation prohibited person is set. That is, the information setting unit 29 may fix a period during which the setting of the operation target person or operation prohibited person is valid, set a predetermined user to the operation target person or the operation prohibited person in the setting valid period, and cancel the setting after the setting valid period is ended. The information setting unit 29 may acquire the operation signal input to the operation unit 54 from the television set controller 51 or acquire the operation signal from the gesture recognition execution unit 28 in response to the instruction from the user, and the information setting unit 29 may cancel the setting of the operation target person or operation prohibited person based on the acquired operation signal.

The information setting unit 29 may read the gesture recognition device processing history information 45 from the gesture-recognition-device storage unit 12 while acquiring the television-set processing history information 61 from the television set controller 51, learn the operation timing on when the user wants to perform the operation with the gesture based on the television-set processing history information 61 and the gesture recognition device processing history information 45, and update the operation timing information 43.

The program, data and the like to be referred to by the gesture recognition device controller 11 is stored in the gesture-recognition-device storage unit 12. For example, the person identification information 41, the user information 42, the operation timing information 43, the gesture information 44, and the gesture recognition device processing history information 45 are stored in the gesture-recognition-device storage unit 12.

The person identification information 41, the user information 42, the operation timing information 43, the gesture information 44, the gesture recognition device processing history information 45, which are stored in the gesture-recognition-device storage unit 12, will be described with reference to FIGS. 4 to 8. FIG. 4 is a chart illustrating an example of the person identification information 41 stored in the gesture-recognition-device storage unit 12. FIG. 5 is a chart illustrating an example of the user information 42 stored in the gesture-recognition-device storage unit 12. FIG. 6 is a chart illustrating an example of the operation timing information 43 stored in the gesture-recognition-device storage unit 12. FIG. 7 is a chart illustrating an example of the gesture information 44 stored in the gesture-recognition-device storage unit 12. FIG. 8 is a chart illustrating an example of the gesture recognition device processing history information 45 stored in the gesture-recognition-device storage unit 12.

(Person Identification Information)

As illustrated in FIG. 4, the person identification information 41 is one in which a user name and individual identification information individually identifying the user and personal attribute information indicating the attribute of the user are correlated with each other. In the example of FIG. 4, a "feature quantity" is indicated as the individual identification information. For example, the "feature quantity" is extracted from the human body image and/or the face image of the user. The person identification unit 23 refers to the "feature quantity" to extract the feature quantity from the human body image or face image, which is detected by the person determination unit 22, identifies which feature quantity included in the person identification information 41 is matched with or approximated by the extracted feature quantity, and individually identifies the user.

In the example of FIG. 4, the "sex", the "body height", the "age", the "race", and the "accessory" are indicated as the personal attribute information. The "sex" indicates the sex of the user. The person identification unit 23 identifies the sex of the user from the human body image or face image, which is detected by the person determination unit 22, based on a lip color, a skin color, existence or non-existence of makeup based on a shape or a color of an eyebrow, existence or non-existence of manicure, existence or non-existence of a beard, a shape of nail (for example, female in the case of the long nail, and male in the case of the short nail), clothing, and footwear. The person identification unit 23 determines which user the person corresponds to from the identified sex. For example, in the example of FIG. 4, when the user is determined to be a woman, the used can be identified as the "mother" because the female user is only the "mother".

The "body height" indicates the body height of the user. The person identification unit 23 identifies the body height of the person from the human body image or face image, which is detected by the person determination unit 22, and determines which user the person corresponds to from the identified body height.

The "age" indicates the age of the user. The person identification unit 23 identifies the age of the person from the human body image or face image, which is detected by the person determination unit 22, and determines which user the person corresponds to from the identified age.

The "race" indicates the race of the user. The person identification unit 23 identifies the race of the person from the human body image or face image, which is detected by the person determination unit 22, based on an eye color, the skin color, the hair color, and the like, and determines which user the person corresponds to from the identified race.

The "accessory" indicates the accessory worn by the user. The person identification unit 23 detects the accessory such as eye glasses, a ring, and a watch from the human body image or face image, which is detected by the person determination unit 22, and determines which user the person wearing the detected accessory corresponds to.

Information on a "body shape" or a "hairstyle" may be included as the personal attribute information in the person identification information 41. In the example of FIG. 4, the person identification information 41 includes six kinds of information. However, the person identification information 41 may include at least one kind of information of the individual identification information or personal attribute information.

(User Information)

As illustrated in FIG. 5, the user information 42 indicates which user is set to the operation target person or the operation prohibited person. In the example of FIG. 5, the "father" is set to the operation target person, and the "child" is set to the operation prohibited person. In the example of FIG. 5, individual users are set to the operation target person and the operation prohibited person. However, the operation target person and the operation prohibited person are not limited to the individual user. For example, the "woman" may be set to the operation target person, a "minor" may be set to the operation prohibited person, and the operation target person or the operation prohibited person may be set depending on the attribute of the user.

In one or more embodiments of the present invention, only the user who is set to the operation target person can perform the operation with the gesture. Alternatively, for example, the television set may be set in the state in which every person can perform the operation with the gesture. In this case, for example, "all the users" may be set to the operation target person.

As described above, the operation target person and the operation prohibited person may previously be set by the instruction of the user of by default.

(Operation Timing Information)

As illustrated in FIG. 6, the operation timing information 43 indicates a condition (the condition that the present time is considered to be the operation timing) that determines whether the present time is the operation timing on when the user wants to perform the operation with the gesture.

After the electronic apparatus performs a predetermined processing, while the electronic apparatus performs a predetermined processing, after a predetermined period has elapsed since the electronic apparatus performs a predetermined processing, after the operation is performed with the gesture, and after a predetermined period has elapsed since the operation is performed with the gesture, there is a high potential that the present time is the operation timing on when the user wants to perform the operation with the gesture. Therefore, the processing condition in FIG. 6 is set as the condition that determines whether the present time is the operation timing.

In the example of FIG. 6, the timing determination unit 26 reads the gesture recognition device processing history information 45 from the gesture-recognition-device storage unit 12, and determines whether the present time is within 5 minutes since the operation is performed with the gesture, or determines whether the present time is within 5 minutes after 20 minutes have elapsed since the operation is performed with the gesture. The timing determination unit 26 determines that the present time is the operation timing when the present time falls into one of the conditions. The timing determination unit 26 acquires the television-set processing history information 61 from the television set controller 51, and determines whether the present time is within 5 minutes since the operation to power on the television set, determines whether the present time is within 1 minute since the operation to change the volume, or determines whether the present time is within 5 minutes after 1 hour has elapsed since the operation to change the channel. The timing determination unit 26 determines that the present time is the operation timing when the present time falls into one of the conditions. The timing determination unit 26 acquires the information indicating the present processing content of the television set 2 from the television set controller 51, and determines that the present time is the operation timing when the commercial is presently displayed on the television set 2.

Thus, in one or more embodiments of the present invention, the timing determination unit 26 determines that the present time is the operation timing when the present time falls into one of the conditions included in the operation timing information 43. Alternatively, for example, the timing determination unit 26 may determine that the present time is the operation timing when the present time falls into at least a predetermined number of conditions included in the operation timing information 43. A degree of reliability may be set to each condition, and the timing determination unit 26 may determine that the present time is the operation timing when a total of the degrees of reliability is greater than or equal to a predetermined value. Each condition included in the operation timing information 43 may be correlated with the user.

Therefore, the timing determination unit 26 can determine the operation timing according to the usage mode of each user.

A specific time period or a day of the week may be added to the conditions of the operation timing information 43. In the case that the electronic apparatus is periodically operated according to a characteristic of the electronic apparatus or the usage mode of the individual, the periodical condition may be set as the operation timing. Thus, the operation timing depends on the characteristic (attribute) of the electronic apparatus and the usage mode of the operator. Therefore, desirably the operation timing is properly set or learned according to the characteristic (attribute) of the electronic apparatus and the usage mode of the operator.

(Gesture Information)

As illustrated in FIG. 7, the gesture information 44 is one in which the gesture and the operation signal are correlated with each other. For example, the gesture recognition execution unit 28 generates an operation signal "S01" in the case that the gesture "only an index finger of a right hand is raised" made by the operation target person is detected from the acquired image. The operation signal "S01" is one that controls power-on and -off of the television set 2, an operation signal "S02" is one that controls the channel change of the television set 2, and an operation signal "S03" is one that controls the volume change of the television set 2.

(Gesture Recognition Device Processing History Information)

As illustrated in FIG. 8, in the gesture recognition device processing history information 45, the operation signal generated by the gesture recognition execution unit 28, the processing date and time when the gesture recognition execution unit 28 performs the gesture recognition processing, and the operation target person who makes the gesture recognized by the gesture recognition execution unit 28 are correlated with one another.

In the example of FIG. 1, the television set 2 is provided with the gesture recognition device 1. Alternatively, the television set 2 may have all the functions of the gesture recognition device 1. Specifically, the television set controller 51 may have the function of the gesture recognition device controller 11, the television-set storage unit 52 may have the information stored in the gesture-recognition-device storage unit 12, and the television-set communication unit 53 may have the function of the gesture recognition device communication unit 13.

<Processing of Gesture Recognition Device>

Figure 9:
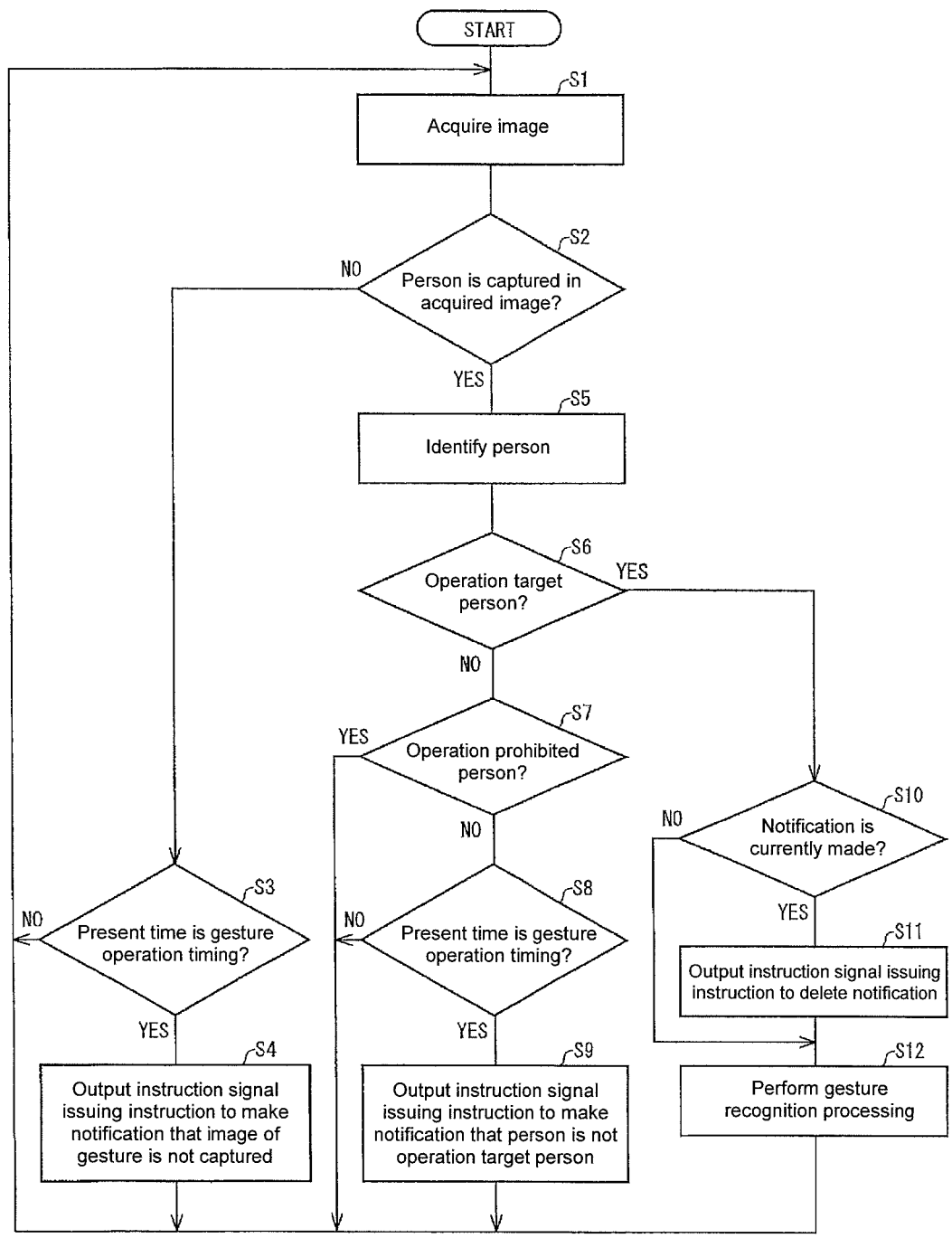
FIG. 9 is a flowchart illustrating an example of processing performed by the gesture recognition device.

The processing performed by the gesture recognition device 1 will be described below with reference to FIGS. 9 to 13. FIG. 9 is a flowchart illustrating an example of the processing performed by the gesture recognition device 1. FIGS. 10 to 13 are views illustrating the images captured by the camera 3. At this point, it is assumed that the user information 42 in FIG. 5 is stored in the gesture-recognition-device storage unit 12. That is, the operation target person is the "father", the operation prohibited person is the "child", and the "mother" is neither the operation target person nor the operation prohibited person.

[The Case that Nobody Comes Out in Image Captured by Camera]

Figure 10:
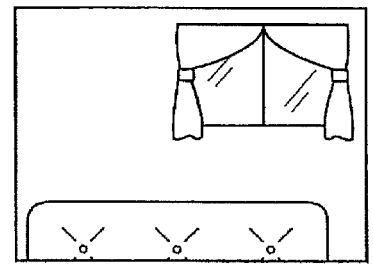
FIG. 10 is a view illustrating an image captured by a camera.

As illustrated in FIG. 10, the processing in the case that nobody comes out in the image captured by the camera 3 will be described below.

As illustrated in FIG. 9, the image acquisition unit 21 acquires the image captured by the camera 3 from the camera 3 through the gesture recognition device communication unit 13 (S1). The person determination unit 22 determines whether the person comes out in the image acquired by the acquisition unit 21 (S2). At this point, because nobody comes out in the image of FIG. 10, the person determination unit 22 detects nothing from the image, but determines that the image of the person is not captured.

When the person determination unit 22 determines that the image of the person is not captured (NO in S2), the timing determination unit 26 determines whether the present time is the operation timing on when the user wants to perform the operation with the gesture based on the present or past processing of the television set 2 or gesture recognition device 1 (S3). When the timing determination unit 26 determines that the present time is the operation timing (YES in S3), the output unit 27 outputs the person out-of-view angle notification instruction signal issuing the instruction to make a notification that the image of the gesture or operation target person is not captured to the television set controller 51 (S4). On the other hand, when the timing determination unit 26 determines that the present time is not the operation timing (NO in S3), the output unit 27 outputs nothing, and the flow returns to S1.

[The Case that Image of "Mother" is Captured by Camera]

Figure 11:
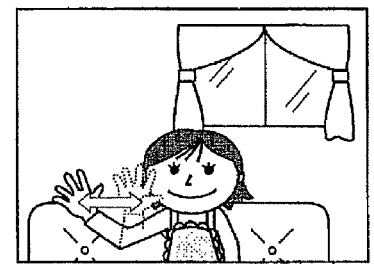
FIG. 11 is a view illustrating the image captured by the camera.

As illustrated in FIG. 11, the processing in the case that the image of the "mother" is captured by the camera 3 will be described below.

As illustrated in FIG. 9, the image acquisition unit 21 acquires the image captured by the camera 3 from the camera 3 through the gesture recognition device communication unit 13 (S1). The person determination unit 22 determines whether the person comes out in the image acquired by the acquisition unit 21 (S2). At this point, because the "mother" comes out in the image of FIG. 11, the person determination unit 22 detects the person from the image, and determines that the image of the person is captured.

When the person determination unit 22 determines that the image of the person is captured (YES in S2), the person identification unit 23 reads the person identification information 41 from the gesture-recognition-device storage unit 12, and identifies the person detected by the person determination unit 22 based on the person identification information 41 (S5). At this point, the person identification unit 23 identifies the person detected by the person determination unit 22 as the "mother".

The user determination unit 24 reads user information 42 from the gesture-recognition-device storage unit 12, and determines whether the person identified by the person identification unit 23 is the operation target person based on the user information 42 (S6). In this case, because the "mother" is not the operation target person, the user determination unit 24 determines that the person is not the operation target person (NO in S6). The user determination unit 24 determines whether the person identified by the person identification unit 23 is the operation prohibited person based on the user information 42 (S7). In this case, because the "mother" is not the operation prohibited person, the user determination unit 24 determines that the person is not the operation prohibited person (NO in S7).

The timing determination unit 26 determines whether the present time is the operation timing on when the user wants to perform the operation with the gesture based on the present or past processing of the television set 2 or gesture recognition device 1 (S8). When the timing determination unit 26 determines that the present time is the operation timing (YES in S8), the output unit 27 outputs the non-operation target person notification instruction signal issuing the instruction to make a notification that the person is not the operation target person to the television set controller 51 (S9). On the other hand, when the timing determination unit 26 determines that the present time is not the operation timing (NO in S8), the output unit 27 outputs nothing, and the flow returns to S1.

[The Case that Image of "Child" is Captured by Camera]

Figure 12:
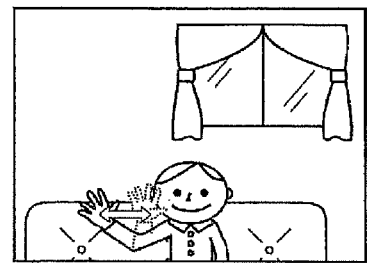
FIG. 12 is a view illustrating the image captured by the camera.

As illustrated in FIG. 12, the processing in the case that the image of the "child" is captured by the camera 3 will be described below.

As illustrated in FIG. 9, the image acquisition unit 21 acquires the image captured by the camera 3 from the camera 3 through the gesture recognition device communication unit 13 (S1). The person determination unit 22 determines whether the person comes out in the image acquired by the acquisition unit 21 (S2). At this point, because the face of the "child" comes out in the image of FIG. 12, the person determination unit 22 detects the person from the image, and determines that the image of the person is captured.

When the person determination unit 22 determines that the image of the person is captured (YES in S2), the person identification unit 23 reads the person identification information 41 from the gesture-recognition-device storage unit 12, and identifies the person detected by the person determination unit 22 based on the person identification information 41 (S5). At this point, the person identification unit 23 identifies the person detected by the person determination unit 22 as the "child".

The user determination unit 24 reads user information 42 from the gesture-recognition-device storage unit 12, and determines whether the person identified by the person identification unit 23 is the operation target person based on the user information 42 (S6). At this point, because the "child" is not the operation target person, the user determination unit 24 determines that the person identified by the person identification unit 23 is not the operation target person (NO in S6). The user determination unit 24 determines whether the person identified by the person identification unit 23 is the operation prohibited person based on the user information 42 (S7). At this point, because the "child" is the operation prohibited person, the user determination unit 24 determines that the person identified by the person identification unit 23 is the operation prohibited person (YES in S7). When the user determination unit 24 determines that the person is the operation prohibited person, the output unit 27 outputs nothing, and the flow returns to S1.

[The Case that Image of "Father" is Captured by Camera]

Figure 13:
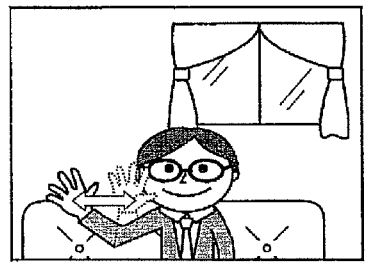
FIG. 13 is a view illustrating the image captured by the camera.

As illustrated in FIG. 13, the processing in the case that the image of the "father" is captured by the camera 3 will be described below.

As illustrated in FIG. 9, the image acquisition unit 21 acquires the image captured by the camera 3 from the camera 3 through the gesture recognition device communication unit 13 (S1). The person determination unit 22 determines whether the person comes out in the image acquired by the acquisition unit 21 (S2). At this point, because the face and the like of the "father" come out in the image of FIG. 12, the person determination unit 22 detects the person from the image, and determines that the image of the person is captured.

When the person determination unit 22 determines that the image of the person is captured (YES in S2), the person identification unit 23 reads the person identification information 41 from the gesture-recognition-device storage unit 12, and identifies the person detected by the person determination unit 22 based on the person identification information 41 (S5). At this point, the person identification unit 23 identifies the person detected by the person determination unit 22 as the "father".

The user determination unit 24 reads user information 42 from the gesture-recognition-device storage unit 12, and determines whether the person identified by the person identification unit 23 is the operation target person based on the user information 42 (S6). In this case, because the "father" is the operation target person, the user determination unit 24 determines that the person is the operation target person (YES in S6).

When the television set controller 51 performs the notification processing in response to the instruction signal (YES in S10), the output unit 27 outputs the notification deletion instruction signal issuing the instruction to delete the notification to the television set controller 51 (S11). The gesture recognition execution unit 28 performs the gesture recognition processing (S12). On the other hand, when the television set controller 51 does not perform the notification processing (NO in S10), the output unit 27 outputs nothing, and the gesture recognition execution unit 28 performs the gesture recognition processing (S12).

In the processing example of FIG. 9, the gesture recognition processing is performed after the determination whether the person is the operation target person. Alternatively, for example, the gesture recognition execution unit 28 may perform the gesture recognition processing to the image acquired by the image acquisition unit 21, and the pieces of processing in S2 to S9 may be performed when the gesture recognition cannot normally be performed.

<Modification>

The case that the electronic apparatus is a security gate will be described as a modification. It is assumed that the security gate is installed at an entrance of a room in which only a female member can walk. It is assumed that the operation target person is a previously-registered female user, and that men are set to the operation prohibited person.

In the case that the image of the gesture made by the female member is not captured by the camera, the security gate notifies the female member that the image of the gesture is not captured. In the case that a woman who is not a member makes the gesture, the security gate notifies the woman who is not the member that the woman is not the operation target person, namely, that the woman is not a member. At this point, the security gate may notify the woman who is not a member of information necessary to become a member. In the case that a man makes the gesture, the security gate notifies the man of nothing. In the security gate, from the standpoint of security, it is undesirable that a person (that is, a man in the above case) except a permitted person (operation target person) and a potential permitted person is notified that an error is generated in the operation with the gesture.

Depending on a balance between the security and convenience of the user, in the case that false determination processing is frequently performed in the sex determination processing, the security gate may make a notification that the person is not a member once in several times even if the person is determined to be a man.

A gesture recognition device according to one or more embodiments of the present invention that recognizes a gesture of a person from an image captured by a camera, and outputs information to an electronic apparatus in order to control the electronic apparatus based on the recognized gesture, the gesture recognition device includes: a person determination section configured to determine whether the person is included in the image; and an output section configured to output person out-of-view angle notification instruction information issuing an instruction to make a notification that the image of the person is not captured, when the person determination section determines that the person is not included in the image.

A method according to one or more embodiments of the present invention for controlling a gesture recognition device that recognizes a gesture of a person from an image captured by a camera, and outputs information to an electronic apparatus in order to control the electronic apparatus based on the recognized gesture, the gesture recognition device control method includes: a person determination step of determining whether the person is included in the image; and an output step of outputting person out-of-view angle notification instruction information issuing an instruction to make a notification that the image of the person is not captured, when the person is determined to be not included in the image in the person determination step.

According to the configuration, the output section outputs the person out-of-view angle notification instruction information issuing the instruction to make the notification that the image of the person is not captured to the electronic apparatus when the person is not included in the image captured by the camera. Based on the person out-of-view angle notification instruction information, the electronic apparatus notifies the person who operates the electronic apparatus that the image of the person is not captured.

Based on the notification from the electronic apparatus, the person who operates the electronic apparatus can understand whether the person is included in the image captured by the camera, namely, whether the person is outside of the view angle of the camera. Therefore, such a useless motion that the person who operates the electronic apparatus makes the identical motion many times in order to cause the electronic apparatus to recognize the gesture although the camera does not capture the image of the person can advantageously be prevented.

A gesture recognition device according to one or more embodiments of the present invention further includes a timing determination section configured to determine whether present time is operation timing on when the person wants to perform an operation with the gesture based on present or past processing of the electronic apparatus or the gesture recognition device. In a gesture recognition device according to one or more embodiments of the present invention, the output section outputs the person out-of-view angle notification instruction information, when the person determination section determines that the person is not included in the image, and when the timing determination section determines that the present time is the operation timing.

According to the configuration, the output section outputs the person out-of-view angle notification instruction information issuing the instruction to make the notification that the image of the person is not captured to the electronic apparatus, when the person is not included in the image captured by the camera, and when the present time is the operation timing on when the person wants to perform the operation with gesture.

In the case that the person who operates the electronic apparatus does not exist in the view angle, sometimes the person who operates the electronic apparatus does not exist in the view angle although the person wants to perform the operation with the gesture, and sometimes the person does not exist in the view angle because the person does not want to perform the operation with the gesture. Only in the case that the person who operates the electronic apparatus is outside of the view angle while the person wants to perform the operation with the gesture, the person who operates the electronic apparatus is notified that the person is outside of the view angle. Therefore, the useless motion of the person can be prevented without obstructing the person who uses the electronic apparatus.

In a gesture recognition device according to one or more embodiments of the present invention, the timing determination section determines that the present time is the operation timing, when the present time is within a predetermined period since the gesture recognition device outputs the information based on the gesture recognition to the electronic apparatus.

There is a high possibility that the person performs the operation with the gesture again within the predetermined period after the person performs the operation with the gesture. In the case that the present time is within the predetermined period since the gesture recognition device outputs the information based on the gesture recognition to the electronic apparatus like the above configuration, the timing determination section determines that the present time is the operation timing. Therefore, the operation timing can accurately be identified based on the processing of the gesture recognition device.

In a gesture recognition device according to one or more embodiments of the present invention, the timing determination section determines that the present time is the operation timing, when a predetermined period has elapsed since the gesture recognition device outputs the information based on the gesture recognition to the electronic apparatus.

There is a high possibility that the person performs the operation with the gesture again within the predetermined period after the predetermined period has elapsed since the person performs the operation with the gesture. For example, in the case that the electronic apparatus is the television set, a TV program is often constructed on an hour-to-hour basis, and the channel is possibly switched when the TV program is ended. Therefore, in the television set, there is a high probability that the operation to switch channels is performed again when 1 hour has elapsed since the operation is performed.

In the case that the predetermined period has elapsed since the gesture recognition device outputs the information based on the gesture recognition to the electronic apparatus like the above configuration, the timing determination section determines that the present time is the operation timing. Therefore, the operation timing can accurately be identified based on the processing of the gesture recognition device.

In a gesture recognition device according to one or more embodiments of the present invention, the timing determination section determines that the present time is the operation timing, when the electronic apparatus performs predetermined processing within a predetermined period.

There is a high possibility that the person performs the operation with the gesture again within the predetermined period after the electronic apparatus performs the predetermined processing. For example, there is a high possibility that the person operates the electronic apparatus immediately after the electronic apparatus is powered on.

In the case that the electronic apparatus performs the predetermined processing within the predetermined period, the timing determination section determines that the present time is the operation timing, like the above configuration. Therefore, the operation timing can accurately be identified based on the processing of the gesture recognition device.

In a gesture recognition device according to one or more embodiments of the present invention, the electronic apparatus is a television set, and the timing determination section determines that the present time is the operation timing, when a commercial is displayed on the television set.

In the case that the commercial is displayed on the television set, there is a high possibility that the person performs the operation such as channel switching. In the case that the commercial is displayed on the television set, the timing determination section determines that the present time is the operation timing, like the above configuration. Therefore, the operation timing can accurately be identified based on the processing of the gesture recognition device.

A gesture recognition device according to one or more embodiments of the present invention includes an operation target person determination section configured to determine whether the person, who is determined to be included in the image by the person determination section, is an operation target person who can operate the electronic apparatus with the gesture. In a gesture recognition device according to one or more embodiments of the present invention, the output section outputs a non-operation target person notification instruction information issuing an instruction to make a notification that the person is not the operation target person, when the operation target person determination section determines that the person is not the operation target person.

In the case that the person who operates the electronic apparatus is not the operation target person, namely, in the case that the person cannot operate the electronic apparatus with the gesture, the output section outputs the non-operation target person notification instruction information issuing the instruction to make a notification that the person is not the operation target person.

Based on the notification from the electronic apparatus, the person who operates the electronic apparatus can understand whether the person is the operation target person. Therefore, such a useless motion that the person who operates the electronic apparatus tries to make the identical gesture many times to cause the electronic apparatus to recognize the gesture although the operation cannot be performed with the gesture can be prevented.

A gesture recognition device according to one or more embodiments of the present invention further includes an operation prohibited person determination section configured to determine whether the person, who is determined to be included in the image by the person determination section, is an operation prohibited person who is prohibited from operating the electronic apparatus with the gesture. In a gesture recognition device according to one or more embodiments of the present invention, the output section does not output the non-operation target person notification instruction information, when the operation prohibited person determination section determines that the person is the operation prohibited person.

In the case that the person who tries to operate the electronic apparatus is the operation prohibited person, namely, in the case that the person who tries to operate the electronic apparatus is prohibited from operating the electronic apparatus with the gesture, the output section does not output the non-operation target person notification instruction information issuing the instruction to make a notification that the person is not the operation target person. Because the operation prohibited person cannot operate the electronic apparatus with the gesture, it is not necessary to notify the operation prohibited person of the information for easily performing the gesture recognition.

In the case that the person who tries to operate the electronic apparatus is the operation prohibited person, the person is not notified of the information. Therefore, the obstruction of the use of the electronic apparatus can be reduced when the person except the operation prohibited person uses the electronic apparatus, and the extra information can be prevented from being provided to the operation prohibited person.

In a gesture recognition device according to one or more embodiments of the present invention, the operation target person determination section determines a person previously set to the person who can operate the electronic apparatus with the gesture to be the operation target person.

In a gesture recognition device according to one or more embodiments of the present invention, the operation target person determination section determines a person who operates the electronic apparatus with the gesture predetermined times to be the operation target person.

In a gesture recognition device according to one or more embodiments of the present invention, the operation target person determination section determines a person who operates the electronic apparatus with the gesture within a predetermined period to be the operation target person.

An electronic apparatus according to one or more embodiments of the present invention includes: the gesture recognition device; and a notification section configured to notify a person according to information output from the output section.

According to the configuration, the electronic apparatus has the same effect as the gesture recognition device.

The gesture recognition device may be constructed by a computer. In this case, a control program, which is configured to cause the computer to work as each of the sections of the gesture recognition device to construct the gesture recognition device, and a computer-readable recording medium in which the control program is recorded are also included in the scope of the present invention.

<Supplement>

The present invention is not limited to the above embodiments, but various changes can be made without departing from the scope of the present invention. That is, one or more embodiments obtained by a combination of technical means, which are properly changed without departing from the scope of the claims, is also included in the technical scope of the present invention.

Each block of the gesture recognition device 1, particularly the gesture recognition device controller 11 may be constructed by hardware logic, or by software using a CPU as described below.

That is, the gesture recognition device 1 includes the CPU that executes a command of a control program implementing each function, a ROM (Read Only Memory) in which the control program is stored, a RAM (Random Access Memory) in which the control program is expanded, and storage devices (recording mediums) such as a memory, in which the control program and various pieces of data are stored. According to one or more embodiments of the present invention, the recording medium in which a program code (an executable format program, an intermediate code program, a source program) of the control program for the gesture recognition device 1 serving as the software implementing the above functions is stored while being readable by a computer is supplied to the gesture recognition device 1, and the computer (or the CPU or an MPU) reads and executes the program code recorded in the recording medium.

Examples of the recording medium include tape systems such as a magnetic tape and a cassette tape, disk systems including magnetic disks such as a floppy (registered trademark) disk and a hard disk, and optical disks such as a CD-ROM, an MO, an MD, a DVD, and a CD-R, card systems such as an IC card (including a memory card) and an optical card, and semiconductor memory systems such as a mask ROM, an EPROM, an EEPROM and a flash ROM.

The gesture recognition device 1 may be configured to be able to be connected to a communication network, and the program code may be supplied through the communication network. There is no particular limitation to the communication network. Examples of the communication network include the Internet, an intranet, an extranet, a LAN, an ISDN, a VAN, a CATV communication network, a virtual private network, a telephone line network, a mobile communication network, and a satellite communication network. There is no particular limitation to a transmission medium constituting the communication network. Examples of the transmission medium include wired lines such as IEEE 1394, a USB, a power-line carrier, a cable TV line, a telephone line, and an ADSL line, and wireless lines such as infrared rays such as an IrDA and a remote controller, Bluetooth (registered trademark), 802.11 wireless, an HDR, a mobile phone network, a satellite line, and a terrestrial digital network. One or more embodiments of the present invention may be achieved in the form of a computer data signal, which is implemented by electronic transmission of the program code while buried in a carrier wave.

One or more embodiments of the present invention can be used in the gesture recognition device, which recognizes the user's gesture from the image captured by the camera and controls the electronic apparatus based on the recognized gesture.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1 gesture recognition device
2 television set (electronic apparatus)
3 camera
4 user
22 person determination unit (person determination section)
24 user determination unit (operation target person determination section and operation prohibited person determination section)
26 timing determination unit (timing determination section)
27 output unit (output section)
55 display unit (notification section)
56 sound output unit (notification section)

The invention claimed is:

1. A gesture recognition device that recognizes a gesture of a person from an image captured by a camera, and outputs information to an electronic apparatus in order to control the electronic apparatus based on the recognized gesture, the gesture recognition device comprising a processor, the processor comprising:

a person determination section that determines whether the person is included in the image;

a timing determination section that determines whether a present time is an operation timing when the person wants to perform an operation with the gesture based on the present time and one or more history data; and an output section that outputs person out-of-view angle notification instruction information issuing an instruction to make a notification that the image of the person is not captured, when the person determination section determines that the person is not included in the image, wherein the output section outputs the person out-of-view angle notification instruction information, when the person determination section determines that the person is not included in the image, and when the timing determination section determines that the present time is the operation timing.

2. The gesture recognition device according to claim 1, wherein the timing determination section determines that the present time is the operation timing, when the present time is within a predetermined period since the gesture recognition device outputs the information based on the gesture recognition to the electronic apparatus.

3. The gesture recognition device according to claim 2, wherein the processor further comprises:

an operation target person determination section that determines whether the person, who is determined to be included in the image by the person determination section, is an operation target person who can operate the electronic apparatus with the gesture, wherein the output section outputs a non-operation target person notification instruction information issuing an instruction to make a notification that the person is not the operation target person, when the operation target person determination section determines that the person is not the operation target person.

4. The gesture recognition device according to claim 1, wherein the timing determination section determines that the present time is the operation timing, when a predetermined period has elapsed since the gesture recognition device outputs the information based on the gesture recognition to the electronic apparatus.

5. The gesture recognition device according to claim 4, wherein the processor further comprises:

an operation target person determination section that determines whether the person, who is determined to be included in the image by the person determination section, is an operation target person who can operate the electronic apparatus with the gesture, wherein the output section outputs a non-operation target person notification instruction information issuing an instruction to make a notification that the person is not the operation target person, when the operation target person determination section determines that the person is not the operation target person.

6. The gesture recognition device according to claim 1, wherein the timing determination section determines that the present time is the operation timing, when the electronic apparatus performs predetermined processing within a predetermined period.

7. The gesture recognition device according to claim 6, wherein the processor further comprises:

an operation target person determination section that determines whether the person, who is determined to be included in the image by the person determination section, is an operation target person who can operate the electronic apparatus with the gesture, wherein the output section outputs a non-operation target person notification instruction information issuing an instruction to make a notification that the person is not the operation target person, when the operation target person determination section determines that the person is not the operation target person.

8. The gesture recognition device according to claim 1, wherein the electronic apparatus is a television set, and wherein the timing determination section determines that the present time is the operation timing, when a commercial is displayed on the television set.

9. The gesture recognition device according to claim 8, wherein the processor further comprises:

an operation target person determination section that determines whether the person, who is determined to be included in the image by the person determination section, is an operation target person who can operate the electronic apparatus with the gesture, wherein the output section outputs a non-operation target person notification instruction information issuing an instruction to make a notification that the person is not the operation target person, when the operation target person determination section determines that the person is not the operation target person.

10. The gesture recognition device according to claim 1, wherein the processor further comprises:

an operation target person determination section that determines whether the person, who is determined to be included in the image by the person determination section, is an operation target person who can operate the electronic apparatus with the gesture, wherein the output section outputs a non-operation target person notification instruction information issuing an instruction to make a notification that the person is not the operation target person, when the operation target person determination section determines that the person is not the operation target person.

11. The gesture recognition device according to claim 1, wherein the processor further comprises:

an operation target person determination section that determines whether the person, who is determined to be included in the image by the person determination section, is an operation target person who can operate the electronic apparatus with the gesture, wherein the output section outputs a non-operation target person notification instruction information issuing an instruction to make a notification that the person is not the operation target person, when the operation target person determination section determines that the person is not the operation target person.

12. The gesture recognition device according to claim 11, wherein the processor further comprises:

an operation prohibited person determination section that determines whether the person, who is determined to be included in the image by the person determination section, is an operation prohibited person who is prohibited from operating the electronic apparatus with the gesture, wherein the output section does not output the non-operation target person notification instruction information, when the operation prohibited person determination section determines that the person is the operation prohibited person.

13. The gesture recognition device according to claim 11, wherein the operation target person determination section determines a person previously set to the person who can operate the electronic apparatus with the gesture to be the operation target person.

14. The gesture recognition device according to claim 11, wherein the operation target person determination section determines a person who operates the electronic apparatus with the gesture predetermined times to be the operation target person.

15. The gesture recognition device according to claim 11, wherein the operation target person determination section determines a person who operates the electronic apparatus with the gesture within a predetermined period to be the operation target person.

16. The gesture recognition device according to claim 1, wherein the one or more history data comprises at least one selected from the list consisting of: a time of a power on operation, a time of a volume change operation, a time of a channel change operation, and a time of a first gesture operation.

17. An electronic apparatus comprising:
the gesture recognition device according to claim 1; and
a notification section that notifies a person according to the information output from the output section.

18. A method for controlling a gesture recognition device that recognizes a gesture of a person from an image captured by a camera, and outputs information to an electronic apparatus in order to control the electronic apparatus based on the recognized gesture, the gesture recognition device control method comprising:

a person determination step of determining whether the person is included in the image;

a timing determination step that determines whether a present time is an operation timing when the person wants to perform an operation with the gesture based on the present time and one or more history data; and an output step of outputting person out-of-view angle notification instruction information issuing an instruction to make a notification that the image of the person is not captured, when the person is determined to be not included in the image in the person determination step, wherein the output step outputs the person out-of-view angle notification instruction information, when the person determination section determines that the person is not included in the image, and when the timing determination section determines that the present time is the operation timing.

19. A non-transitory computer-readable recording medium storing a control program that causes a computer to control a gesture recognition device that recognizes a gesture of a person from an image captured by a camera, and outputs information to an electronic apparatus in order to control the electronic apparatus based on the recognized gesture, the control program causing the computer to perform:

a person determination step of determining whether the person is included in the image; and a timing determination step that determines whether a present time is an operation timing when the person wants to perform an operation with the gesture based on the present time and one or more history data; and an output step of outputting person out-of-view angle notification instruction information issuing an instruction to make a notification that the image of the person is not captured, when the person is determined to be not included in the image in the person determination step, wherein the output step outputs the person out-of-view angle notification instruction information, when the person determination section determines that the person is not included in the image, and when the timing determination section determines that the present time is the operation timing.

* * * * *